(12) United States Patent
Rhodes et al.

(10) Patent No.: US 6,398,830 B1
(45) Date of Patent: Jun. 4, 2002

(54) FILTRATION ASSEMBLY

(75) Inventors: Harry George Rhodes; Michael David Thompson, both of Newcastle-under-Lyme (GB)

(73) Assignee: Pal Adhesive Products Limited (GB)

( * ) Notice: Subject to any disclaimer, the term of this patent is extended or adjusted under 35 U.S.C. 154(b) by 0 days.

(21) Appl. No.: 09/496,154

(22) Filed: Feb. 1, 2000

(51) Int. Cl.[7] .......................... B01D 39/16; B01D 46/10
(52) U.S. Cl. ...................... 55/385.1; 55/490; 55/528; 55/DIG. 5
(58) Field of Search ................... 55/385.1, 490, 55/495, 502, 505, 507, 509–511, 527, 528, DIG. 5

(56) References Cited

U.S. PATENT DOCUMENTS

| | | | | |
|---|---|---|---|---|
| 1,953,621 A | * | 4/1934 | Masters | 55/502 X |
| 2,663,660 A | * | 12/1953 | Layte | 55/502 X |
| 2,988,169 A | * | 6/1961 | Klein | 55/502 |
| 3,127,259 A | * | 3/1964 | Boylan | 55/511 |
| 3,408,438 A | * | 10/1968 | Staunton | 55/502 X |
| 3,415,384 A | * | 12/1968 | Kasten | 55/502 X |
| 3,458,130 A | * | 7/1969 | Juhlin | 55/511 X |
| 3,520,416 A | * | 7/1970 | Keedwell | 55/528 X |
| 3,521,630 A | * | 7/1970 | Westberg et al. | 55/528 X |
| 4,227,953 A | * | 10/1980 | Wasielewski et al. | 55/502 X |
| 4,776,262 A | * | 10/1988 | Curran | 55/502 X |
| 4,889,542 A | * | 12/1989 | Hayes | 55/502 X |
| 5,147,430 A | * | 9/1992 | Kidd | 55/505 X |
| 5,417,743 A | * | 5/1995 | Dauber | 55/502 X |
| 5,433,764 A | * | 7/1995 | Matschke | 55/511 |
| 5,462,569 A | * | 10/1995 | Benjamin | 55/495 X |
| 5,482,622 A | * | 1/1996 | Stark et al. | 55/502 X |

FOREIGN PATENT DOCUMENTS

| | | |
|---|---|---|
| DE | 196 04 256 | 8/1997 |
| EP | 0 126 816 | 12/1984 |
| EP | 0376386 A1 | 7/1990 |
| EP | 0376386 B1 | 7/1990 |
| EP | 0 613 670 | 9/1994 |
| JP | 09220418 | 8/1997 |
| WO | WO 85/02351 | 6/1985 |

* cited by examiner

*Primary Examiner*—Robert H. Spitzer
(74) *Attorney, Agent, or Firm*—Watts, Hoffman, Fisher & Heinke Co. L.P. A.

(57) ABSTRACT

A filter tape 10 for sealing the ends of sheeting. The tape 10 comprising a central portion 16 of an air permeable material 12, which portion 16 is locatable over the end of the sheeting, and longitudinal side portions 14 with adhesive thereon for adhering to the sides of the sheet.

23 Claims, 4 Drawing Sheets

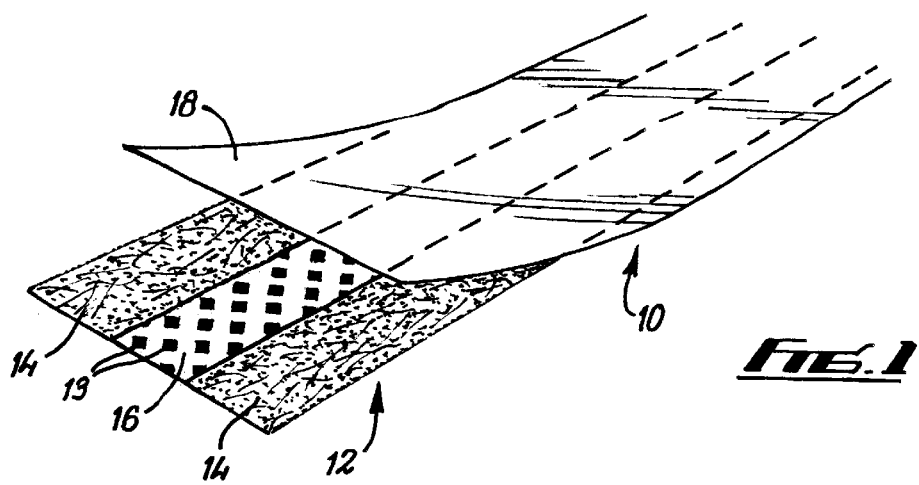
FIG.1
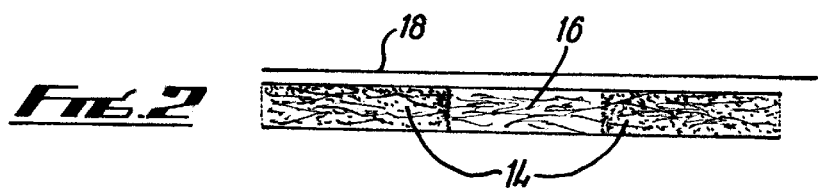
FIG.2
FIG.3
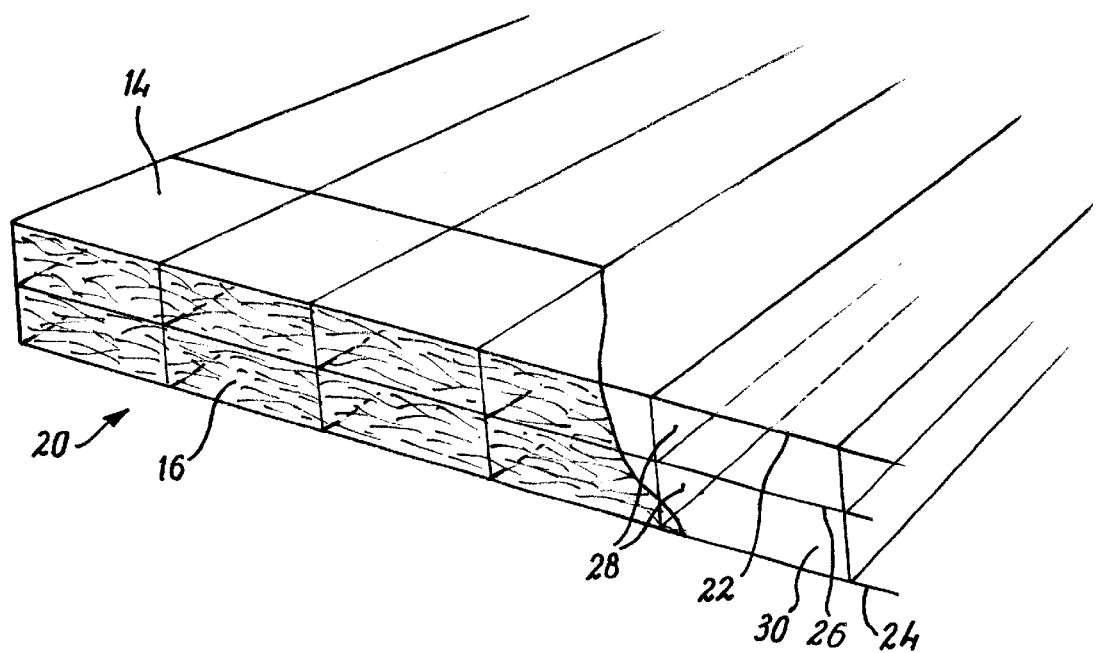

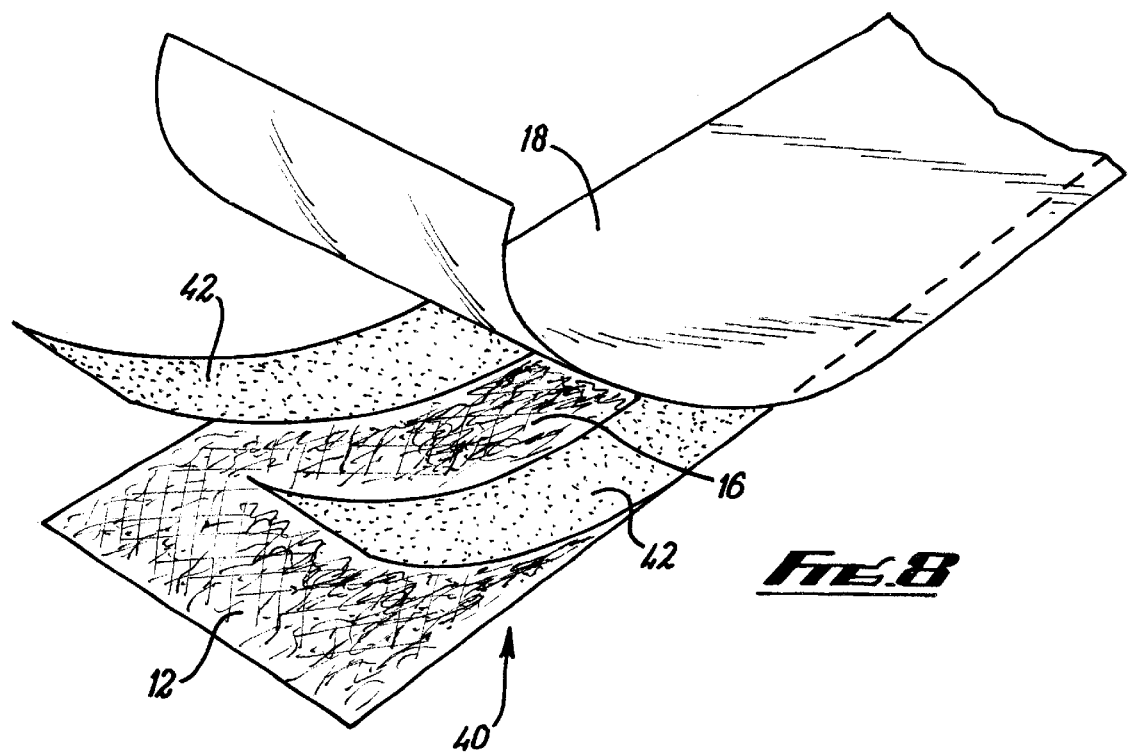
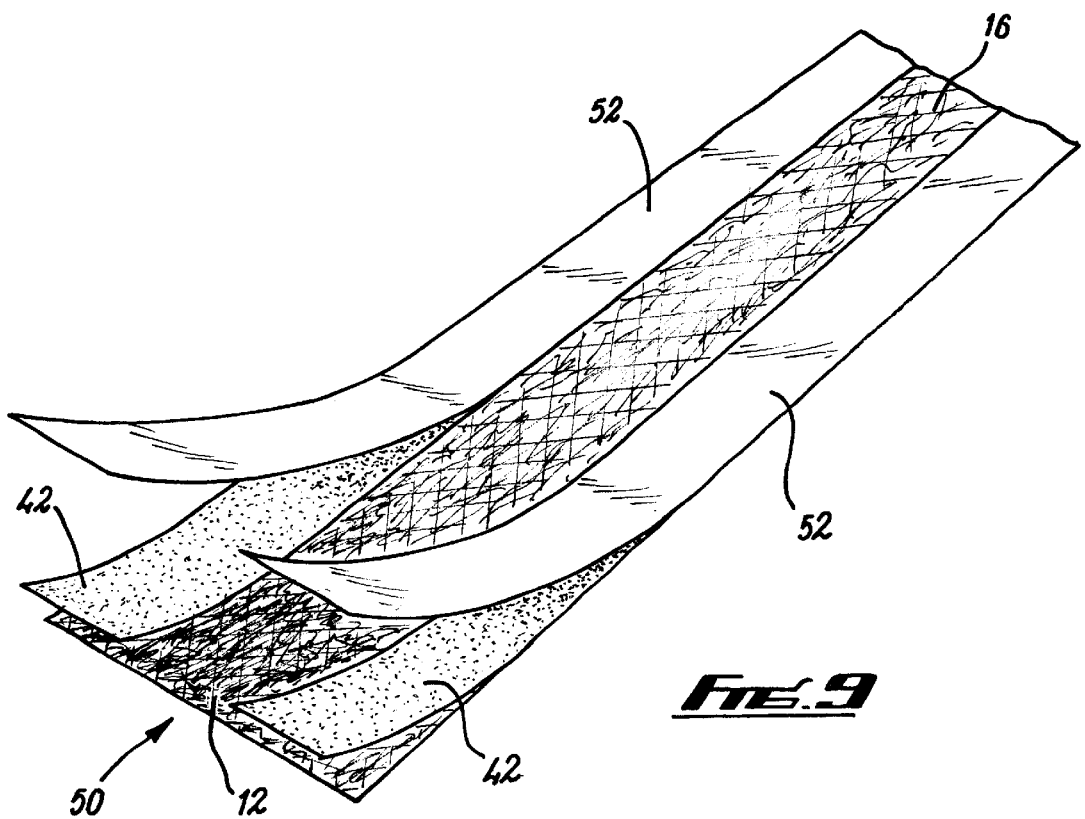

FILTRATION ASSEMBLY

This invention concerns a filtration assembly, and particularly but not exclusively a filtration assembly for sealing the ends of hollow sheeting.

Multi-wall sheeting is commonly used as a roofing material for conservatories, awnings, carports etc., or in other applications such as a walling material. Characteristically it obtains its strength by virtue of its construction which is usually in the form of a laminated cell structure. This structure is generally quite open, and is usually exposed to atmosphere at sheet ends.

In for instance its use as a roof covering the multi-wall sheeting is exposed to a wide range of moisture and temperature conditions as well as internal condensation. The various joints and seals are therefore critical to the integrity of the roof. Of great importance is the requirement to prevent water; insects; dust particles; pollen, fungal and algae spores from gaining entrance to the internal cells of the laminate cell structure of the roofing plastic. Once established within the laminate these can cause unsightly growths which are extremely difficult to eliminate.

According to the present invention there is provided a filtration assembly, the assembly comprising a length of tape of a material which is permeable to air but generally prevents insects; dust particles; pollen, fungal and algae spores passing therethrough; the tape comprising a central portion extending along its length and locatable over an open end of hollow sheeting, and side portions extending longitudinally on either side of the central portion, the side portions having adhesive means on the tape to enable said portions to adhere to the hollow sheeting on either side of the open end.

The material is preferably, such that water impacting thereagainst will generally not pass through, but water can soak therethrough.

The adhesive means preferably comprises respective layers of adhesive.

The adhesive is preferably substantially at least partially soaked into the material in said side portions.

The adhesive is preferably waterproof, is preferably pressure sensitive, and desirably is a hot melt adhesive. The adhesive may be coloured, and desirably red or brown.

Alternatively the adhesive may be of the type which sets from a solution. The adhesive may comprise an acrylic.

In an alternative embodiment the adhesive means comprises respective strips of double sided adhesive tape.

The material is preferably non-woven and may be spun bond. The material is preferably fused together at a number of discrete locations, which locations may be provided in a regular pattern. The material may comprise polypropylene or polyester. The material is preferably of a type to inhibit fungal growth therein. The material preferably includes a UV resistant additive.

The invention also comprises a filter tape according to any of the preceding seven paragraphs.

The tape is preferably provided in the form of a roll and may comprise a removable backing layer. The backing layer may comprise high density polythene treated with silicone. The backing layer may be wider than the material. The backing layer may be in two discrete parts, each covering a respective one of the side portions.

The invention further comprises a method of making a filter tape according to either of the preceding two paragraphs, the method comprising applying the adhesive onto the material into the areas corresponding to the side portions.

Where the adhesive is of the hot melt type, the adhesive is preferably melted prior to application.

The adhesive is preferably applied as a bead along each side of the material.

After application of the adhesive the tape is preferably squeezed to force the adhesive into the material. The tape may pass between two rollers to apply the squeezing force. As the material passes between the rollers the backing layer is preferably applied onto the material.

Two or more lengths of tape may be simultaneously formed on a double width piece of material with a respective side portion of each length of tape being formed as a double width of adhesive covered material, with the double width tape subsequently being cut into separate lengths.

The invention still further comprises a method of sealing hollow sheeting, the method comprising applying a tape according to any of the preceding seven paragraphs over the open end or ends of the sheeting.

An embodiment of the present invention will now be described by way of example only and with reference to the accompanying drawings, in which:

FIG. 1 is a diagrammatic perspective view of part of a first filter tape according to the invention;

FIG. 2 is a diagrammatic cross-sectional view of the tape of FIG. 1, with the thickness of the tape exaggerated;

FIG. 3 is a diagrammatic partially cut-away perspective view of the tape of FIG. 1 applied onto a hollow sheet;

FIG. 8 is a similar view to FIG. 1 of a second filter tape according to the invention; and FIG. 9 is a similar view to FIG. 1 of a third filter tape according to the invention.

Figure 4:
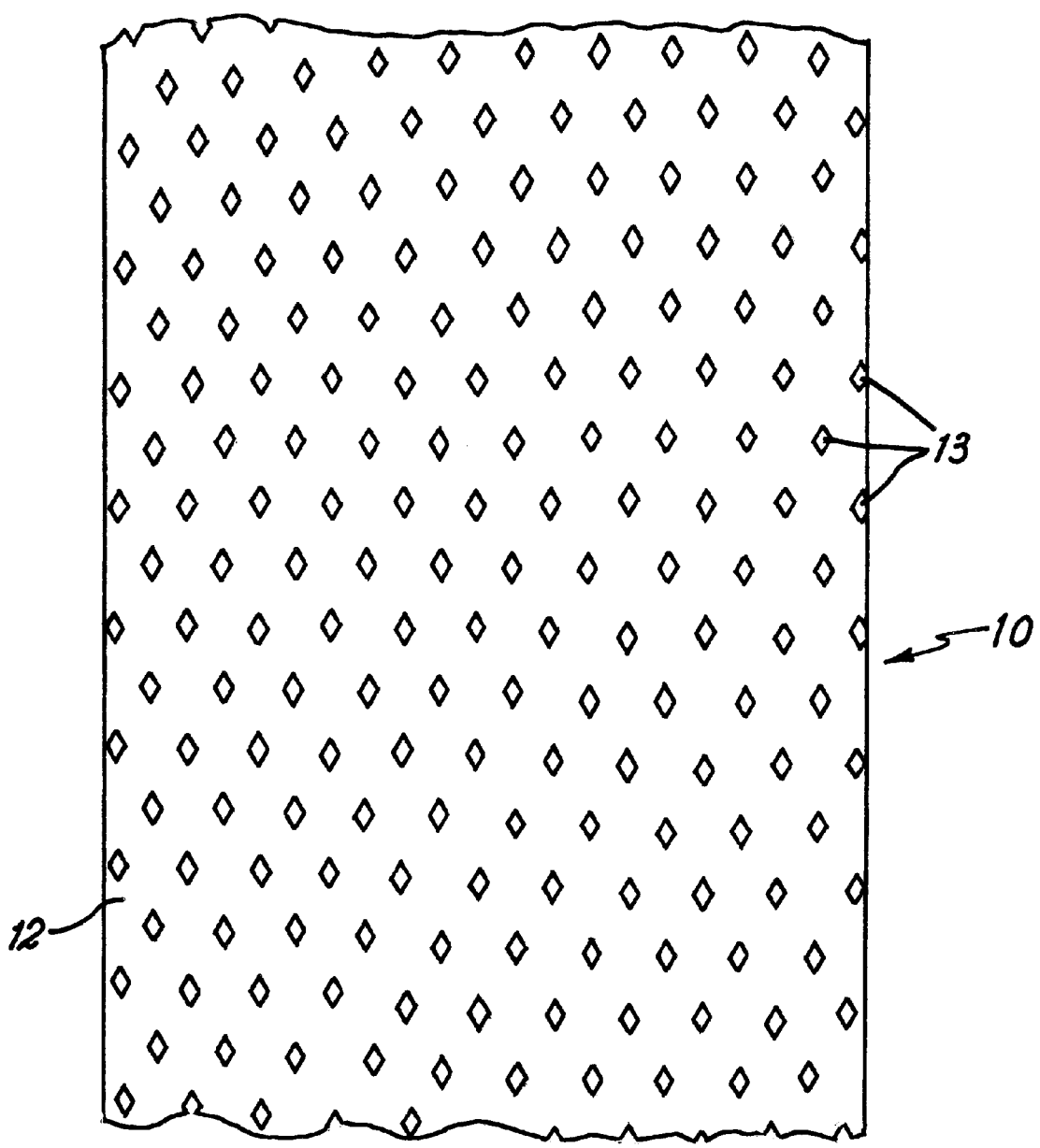
FIG. 4 is a diagrammatic view from below of part of the tape of FIG. 1.

FIGS. 1 to 4 of the drawings show a filter tape 10. The tape 10 comprises a length of non-woven spun bond propylene material 12. The material 12 comprises a single web of randomly laid fibres thermally bonded at discrete areas 13. The areas 13 are arranged in a regular diamond pattern as shown in FIGS. 1 and 4. The bonded areas 13 comprise fused together fibres which impart strength to the material 12. The remaining unbonded fibres provide an open pore structure which is permeable to air and water and acts as a filter.

The propylene has a construction so as to be permeable to air and water vapour, but to generally prevent insects; dust particles; pollen, fungal and algae spores passing therethrough. The construction of the propylene is such to inhibit fungal growth, as the material substantially cannot harbour fungal spores. Whilst water impacting thereagainst will generally not pass through, water can soak through the material 12. The propylene includes a UV resistant additive.

Longitudinal side portions 14 of the material 12 have a substantially waterproof hot melt pressure sensitive adhesive applied thereto and at least partially absorbed into the material 12. A central portion 16 is provided free of adhesive.

The tape 10 is supplied in rolls with a backing layer 18 made of silicone treated high density polythene. The layer 18 is a little wider than the material 12 and extends from one side thereof to ease removal. The adhesive is coloured so that the boundary between the portions 14 and 16 is visible. A red or brown colour is generally used as this provides a filtering out of UV radiation.

FIG. 3 diagrammatically shows an end of a typical hollow sheeting 20. Such sheeting is currently used in a wide range of applications as outlined above. The sheeting comprises upper and lower panels 22,24 with an intermediate panel 26. The panels 22–26 are interconnected and held apart by perpendicular webs 28, thereby defining rectangular cross-section hollow longitudinal cavities 30 extending through the sheeting 20 and which are open at each end.

FIG. 3 shows the tape 10 applied onto an end of the sheeting 20. The tape 10 is dimensioned such that the central portion 16 substantially overlies the open end of the sheeting 20 thereby closing the cavities 30. The side portions 14 engage respectively on the upper and lower panels 22, 24. The pressure sensitive adhesive in the portions 14 allow the portions 14 to readily adhere to the panels 22, 24 and provide a substantially waterproof seal thereagainst. The central portion 16 provides a seal to the cavities 30 which permits air to pass therethrough thereby allowing ventilation thereof, but generally prevents water; insects; dust particles; pollen, fungal or algae spores from entering the cavities 30 and thus causing unsightly growth or discolouring.

Figure 5:
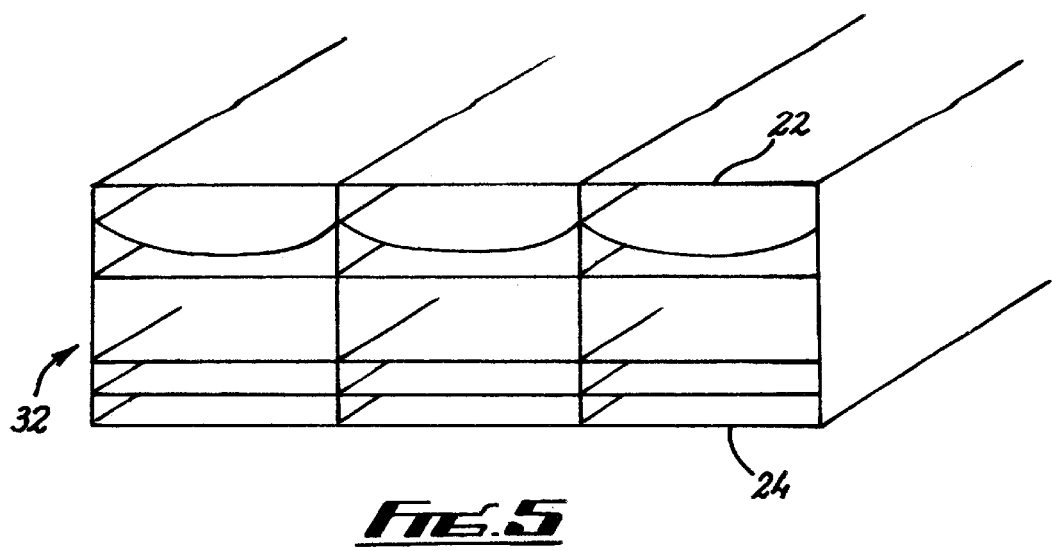
FIGS. 5 to 7 are respectively diagrammatic perspective views of further hollow sheets.
Figure 6:
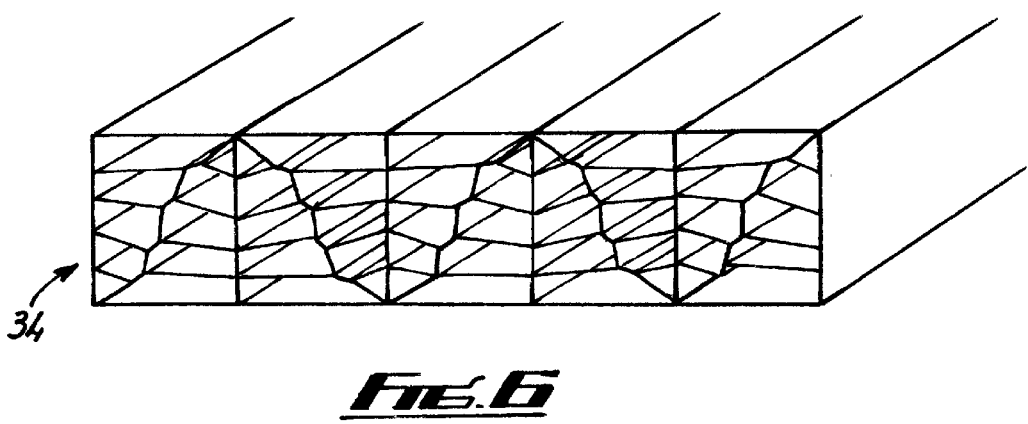
Figure 7:
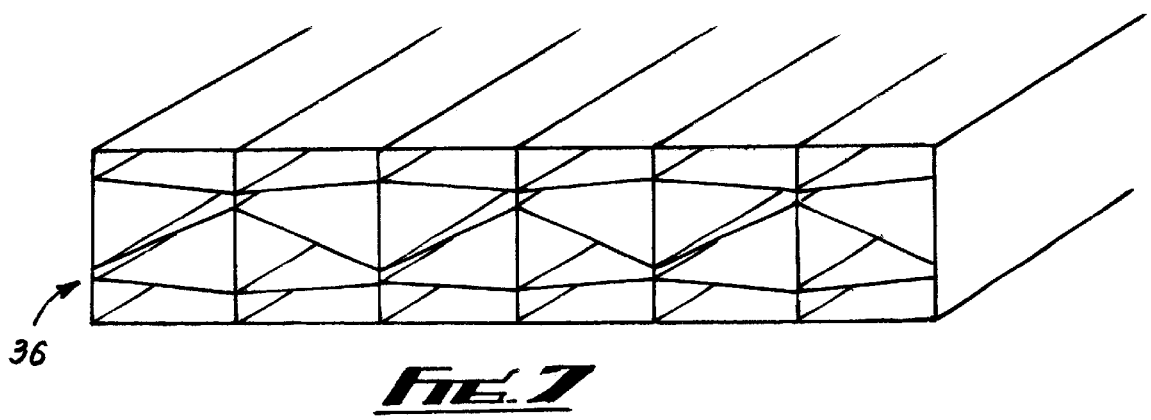

The tape 10 is usable on sheeting with different structures to the sheeting 20. FIGS. 5 to 7 show respectively three further types of sheeting 32,34,36 upon which the tape 10 is usable. Each of the sheeting 32,34,36 again has upper and lower panels 22,24 but a different pattern of webs and intermediate panels therebetween.

The tape 10 can be formed in the following manner. The adhesive is melted and applied as beads onto either side of the polyester. The material is then passed between two pinch rollers to urge the adhesive into the material in the side portions 14. The backing layer 18 is simultaneously applied from the top of the pinch rollers. The tape 10 is then formed into rolls for application as described above. Two lengths of tape 10 can be formed from a single wider piece of material, with a central respective pair of the side portions 14 being formed as a wider portion, and the two lengths of tape subsequently being cut through the middle of the wider side portion.

FIG. 8 shows a further filter tape 40. The tape 40 is similar to the tape 10 except that the adhesive means are provided by two lengths 42 of double sided adhesive tape.

FIG. 9 shows a still further tape 50. The tape 50 is similar to the tape 40 except that the backing layer is in the form of two discrete strips 52, each covering a respective one of the lengths 42. In use this enables a one of the strips 52 to initially be removed to allow the tape 50 to be positioned on a sheet, and the other strip 52 to simultaneously be removed to permit fixing one the sheet once the required positioning has been achieved. Such an arrangement could also be provided on tapes with adhesive on.

There is thus described filter tapes which provide for a number of advantageous features. The permeable material covers the whole of the end of the sheeting, to allow each opening therein to be ventilated. The tape can readily be applied, and a natural fold tends to occur between the centre and side portions to aid the application. The tape can be relatively easily formed as described above and thus can be made relatively inexpensively, whilst providing for reliable and long term performance. As water can soak through the material, any condensation forming in the cavities can drain therefrom.

Various modifications may be made without departing from the scope of the invention. For example, different materials could be used than those outlined above, such as polyester for the tape body. The adhesive could be of a type which sets from a solution, and may comprise an acrylic. The tape could be formed in a different manner and more than two lengths of the tape could simultaneously be formed together. The bonded areas may be provided in a different pattern.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A filtration assembly comprising a length of tape of a material which is permeable to air but generally prevents insects; dust particles; pollen, fungal and algae spores passing therethrough; said tape comprising a longitudinally extending central portion, said central portion being locatable over an open end of hollow sheeting, the tape including longitudinally extending side portions connected to and on either side of said central portion; adhesive on said side portions to enable said side portions to adhere to such hollow sheeting on either side of the open end and said tape being bendable along junctures respectively between the central portion and the side portions whereby the tape can be positioned with the end portion covering an end of a hollow sheeting member and the side portions may be adhered to end parts of top and bottom surfaces of such member while said central portion is maintained in a generally planer condition.

2. An assembly according to claim 1, wherein said adhesive comprises respective layers of adhesive on each said side portion.

3. An assembly according to claim 2, wherein said adhesive is substantially at least partially soaked into said material in said side portions.

4. An assembly according to claim 2, wherein said adhesive is waterproof.

5. An assembly according to claim 2, wherein said adhesive is pressure sensitive.

6. An assembly according to claim 2, wherein said adhesive is a hot melt adhesive.

7. An assembly according to claim 2, wherein said adhesive is an acrylic.

8. An assembly according to claim 1, wherein said adhesive comprises a strip of double sided adhesive tape on each said side portion.

9. An assembly according to claim 1, wherein said material is non-woven.

10. An assembly according to claim 9, wherein said material is spun bond.

11. An assembly according to claim 9, wherein said material is fused together at a number of discrete locations.

12. An assembly according to claim 1, wherein said locations are in the central portion and provided in a regular pattern.

13. An assembly according to claim 1, wherein said material comprises polypropylene.

14. An assembly according to claim 1, wherein said material comprises polyester.

15. An assembly according to claim 1, wherein said material includes a UV resistant additive.

16. A filter tape of a material which is permeable to air but generally prevents insects; dust particles; pollen, fungal and algae spores passing therethrough; said tape comprising a longitudinally extending central portion, said central portion being:locatable over an open end of hollow sheeting, to close same, said tape also comprising longitudinally extending side portions either side of said central portion; adhesive means being provided on said side portions to enable said side portions to adhere to the hollow sheeting on either side of the open end, said tape being in the form of a roll and including a removable backing layer.

17. A tape according to clam 16, wherein said backing layer comprises high density polythene treated with silicone.

18. A tape according to claim 16, wherein said backing layer is wider than said material.

19. A tape according to claim 16, wherein said backing layer comprises two discrete parts, each said part covering a respective one of said side portions.

20. In combination:
   a) a hollow sheeting member having at least one tubular passage extending from one open end of the member to the another end;
   b) a filter tape including a permeable central portion overlying and closing said open ends to inhibit the ingress of foreign matter into said passage; and,
   c) the tape including side portions respectively folded over and adhered to sheeting surfaces adjacent said open end.

21. The combination of claim 20 wherein the central portion is permeable to water at least in its vapor state whereby water in a sheeting passage may exit the sheeting member through the central portion.

22. A method of closing ends of passages of a piece of tubular sheeting comprising:
   a) positioning a permeable center portion of a section of tape in abutment with an open end of the piece to inhibit the ingress of polutents into at least one such passage while permitting gases in the passage to communicate with the ambient atmosphere; and,
   b) fixing the tape section in position to permeably close ends of the passages by folding spaced side portions of the section over opposite end portions of the sheeting and fixing the side portions to the end portions.

23. The process of claim 22 wherein the side portions are fixed to the end portions by pressure sensitive adhesives.

\* \* \* \* \*